United States Patent
Shimada et al.

(10) Patent No.: US 8,428,131 B2
(45) Date of Patent: Apr. 23, 2013

(54) VIDEO ENCODER AND DECODER USING REGION BASED CODING AND DECODING TECHNIQUES WITH SEQUENTIAL REFRESH

(75) Inventors: Satoshi Shimada, Kawasaki (JP); Akira Nakagawa, Kawasaki (JP); Akihiro Yamori, Kawasaki (JP); Chikara Imajo, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 12/723,170

(22) Filed: Mar. 12, 2010

(65) Prior Publication Data

US 2010/0172412 A1 Jul. 8, 2010

Related U.S. Application Data

(63) Continuation of application No. PCT/JP2007/001011, filed on Sep. 18, 2007.

(51) Int. Cl.
*H04N 7/12* (2006.01)
(52) U.S. Cl.
USPC .................. 375/240.12; 382/236; 382/238
(58) Field of Classification Search .......... 375/130–153, 375/240.01–240.29; 704/500–504; 382/236, 382/238; *H04N 7/12, 7/24, 7/26, 11/02, H04N 11/04; H04B 1/66*
See application file for complete search history.

(56) References Cited

U.S. PATENT DOCUMENTS

| | | | |
|---|---|---|---|
| 5,057,916 A | | 10/1991 | Krause et al. |
| 6,304,295 B1 * | | 10/2001 | Krishnamurthy et al. . 348/420.1 |
| 6,516,095 B1 * | | 2/2003 | Kadono ........................ 382/243 |
| 2003/0165194 A1 | | 9/2003 | Assaf |
| 2004/0008766 A1 * | | 1/2004 | Wang et al. .............. 375/240.01 |
| 2004/0028282 A1 * | | 2/2004 | Kato et al. .................... 382/236 |
| 2005/0201470 A1 | | 9/2005 | Sievers |
| 2006/0115001 A1 * | | 6/2006 | Wang et al. .............. 375/240.24 |

FOREIGN PATENT DOCUMENTS

| | | |
|---|---|---|
| JP | 60-066584 | 4/1985 |
| JP | 4-286489 | 10/1992 |
| JP | 06-113286 | 4/1994 |
| JP | 07-023392 | 1/1995 |
| JP | 07-322242 | 12/1995 |
| JP | 10-079945 | 3/1998 |

(Continued)

OTHER PUBLICATIONS

Japanese Office Action mailed Nov. 13, 2012 in corresponding Japanese Application No. 2009-532962.

*Primary Examiner* — Jay Au Patel
*Assistant Examiner* — Jessica Prince
(74) *Attorney, Agent, or Firm* — Staas & Halsey LLP

(57) ABSTRACT

A video encoder that encodes each of a plurality of blocks obtained by dividing an input image, includes: a definition unit configured to define a valid area which is allowed to be used as reference in a reference image in interframe coding; a detection unit configured to detect a reference area in the reference image for a target block; a predicted image generation unit configured to generate a predicted image by outputting an image of the reference area for the reference area belonging to the valid area and outputting a complementary image for the reference area not belonging to the valid area; and a coding unit configured to encode the input image using the predicted image, wherein valid area information indicating the valid area is transmitted to a video decoder, for each group of a plurality of blocks.

7 Claims, 19 Drawing Sheets

FOREIGN PATENT DOCUMENTS

| | | |
|---|---|---|
| JP | 2001-061150 | 3/2001 |
| JP | 2001-346217 | 12/2001 |
| JP | 2003-179938 | 6/2003 |
| JP | 2005-260936 | 9/2005 |
| JP | 2006-505153 | 2/2006 |
| JP | 2007-110409 | 4/2007 |
| WO | WO 03/094530 | 11/2003 |

* cited by examiner

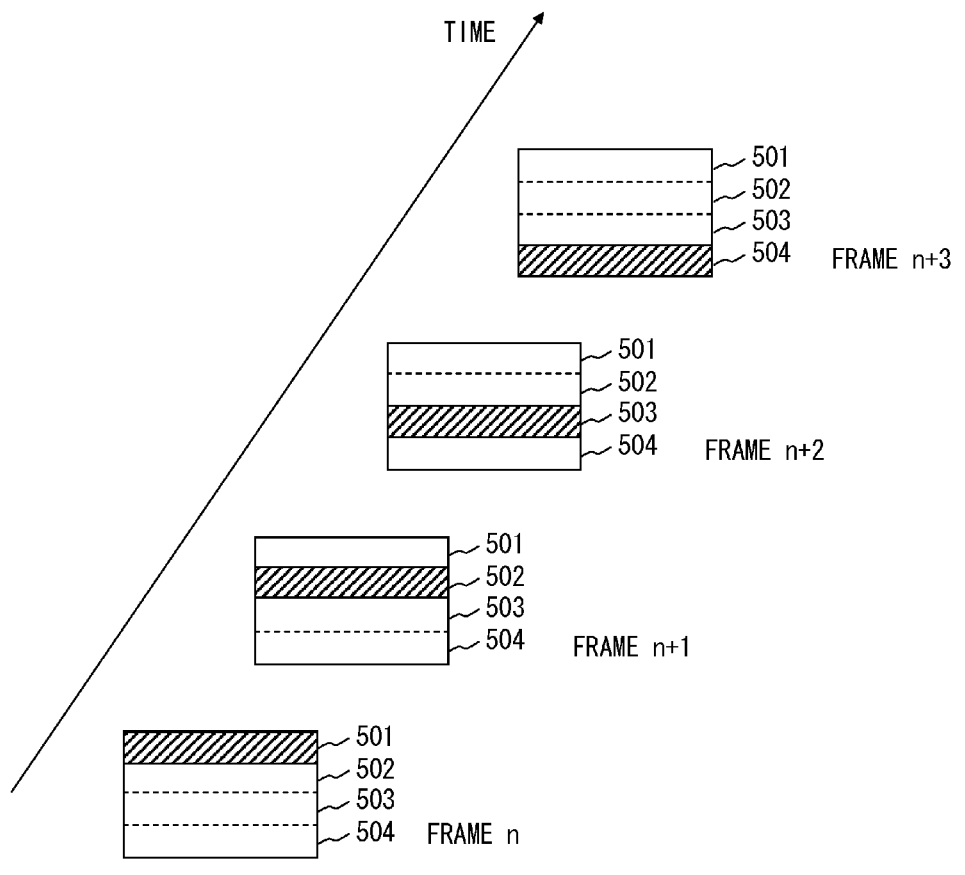
F I G. 1

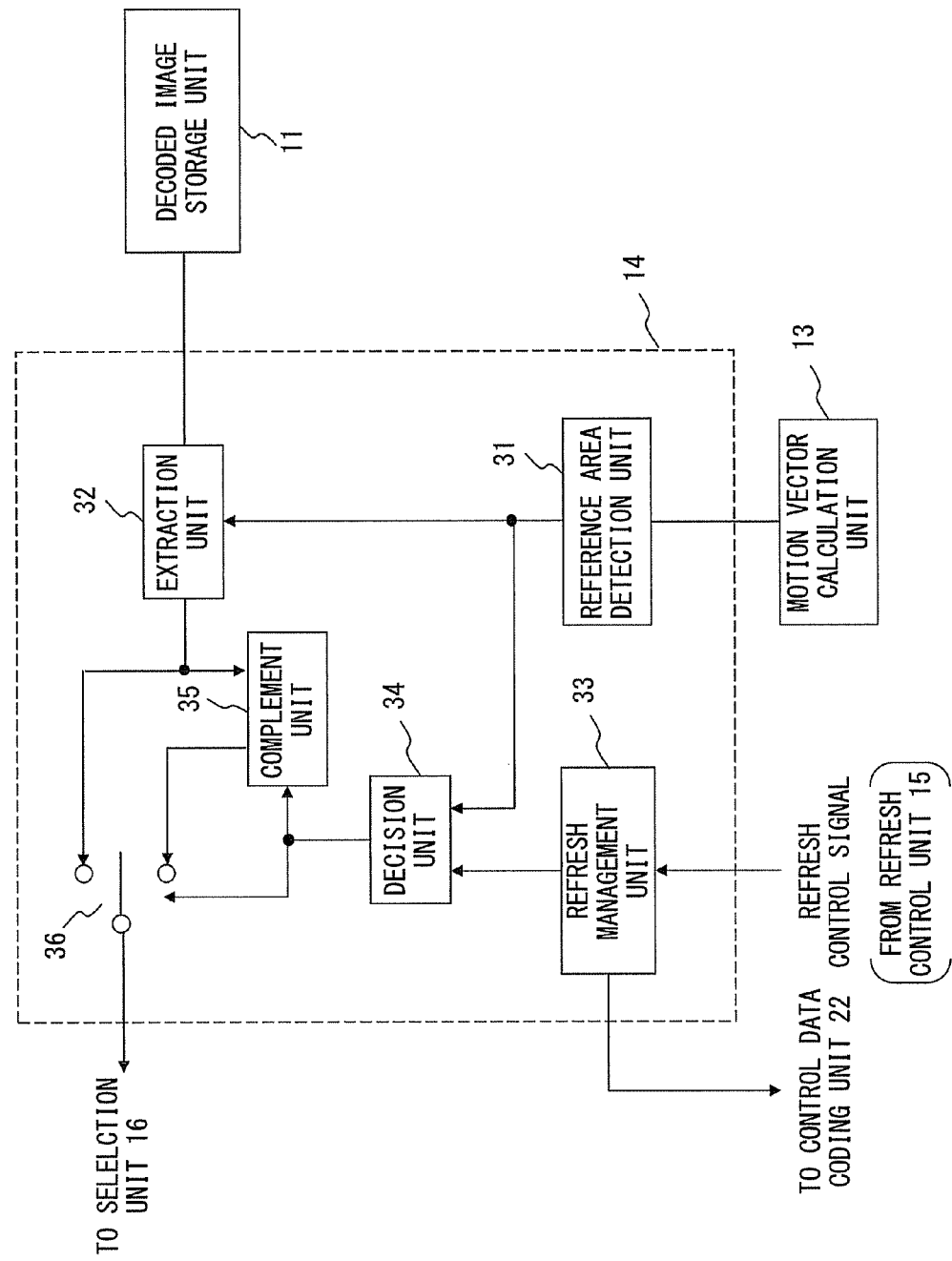
F I G. 7

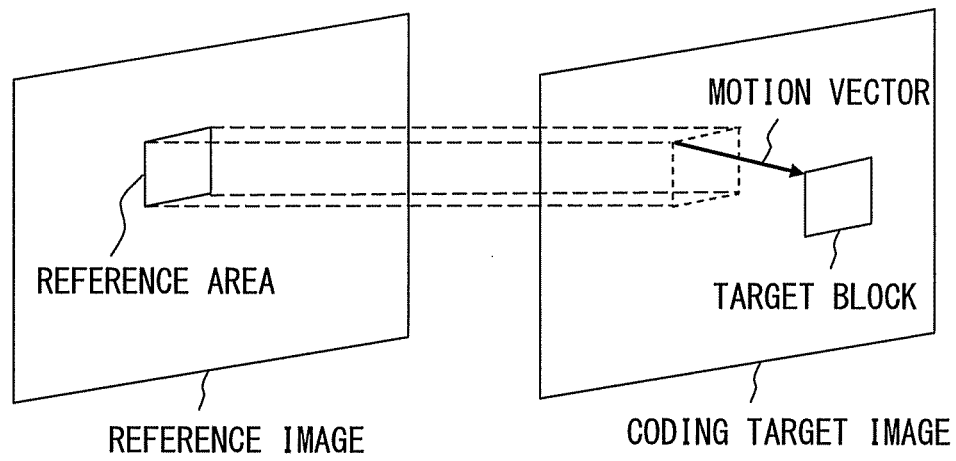
F I G. 8

VIDEO ENCODER AND DECODER USING REGION BASED CODING AND DECODING TECHNIQUES WITH SEQUENTIAL REFRESH

CROSS-REFERENCE TO RELATED APPLICATIONS

This application is a continuation of international application PCT/JP2007/001011, which was filed on Sep. 18, 2007, the entire contents of which are incorporated herein by reference.

FIELD

The present invention relates to a video encoder and a video decoder having a motion compensation function.

BACKGROUND

Motion-compensated interframe prediction coding has been known as a coding system for moving image data. In the motion-compensated interframe prediction coding, motion vector representing the "motion" of a picture element between frames is detected in an encoder. Using the detected motion vector, the image of a current frame is predicted from a past frame (or, from both of a past frame and a future frame), and the difference (that is, error) between the current image and the predicted image is detected. Then, the motion vector information and the prediction error information are transmitted. A decoder reproduces a moving image using the motion vector information and the prediction error information.

Once an error which corrupts the transmitted date occurs in the motion-compensated interframe prediction coding, the error is propagated to subsequent frames. For this reason, in the motion-compensated interframe prediction coding, usually, an intraframe-coded picture is periodically inserted. The intraframe-coded picture is encoded independently from other frames. Therefore, even if an error occurs, the error is not propagated to the subsequent frames of the intraframe-coded picture.

However, the information amount of the intraframe-coded picture is significantly larger than that of an interframe-coded picture. Therefore, the periodical insertion of the intraframe-coded picture raises the peak value of traffic. In order to secure the traffic, the buffer size needs to be increased.

As a technique for solving the problem, a coding system called sequential refresh has been proposed. The sequential refresh is explained with reference to FIG. 1. Here, "refresh" means to perform the intraframe coding. In the following explanation, each frame is assumed to have four areas 501-504.

As illustrated in FIG. 1, in a frame n, the image in the area 501 is encoded by the intraframe coding, and the images in the areas 502-504 are encoded by the interframe coding. Next, in a frame n+1, the image in the area 502 is encoded by the intraframe coding, and the images in the areas 501, 503, 504 are encoded by the interframe coding. In a similar manner, in a frame n+2, the image in the area 503 is encoded by the intraframe coding, and in a frame n+3, the image in the area 504 is encoded by the intraframe coding. Thus, in the example illustrated in FIG. 1, all areas are refreshed in a cycle of four frames. The sequential refresh is described in, for example, Japanese Laid-open Patent Publication No. 2003-179938, Japanese Laid-open Patent Publication No. 6-113286 and Japanese Laid-open Patent Publication No. 2005-260936.

Meanwhile, in the motion-compensated interframe coding adopting the sequential refresh, in order to suppress the propagation of an error, or to provide a "cue play function", the reference area for the motion compensation needs to be restricted. Hereinafter, referring to FIG. 2-FIG. 4, the restriction of the reference area is explained. In FIG. 2-FIG. 4, in the same manner as in FIG. 1, it is assumed that the areas 501, 502, 503, 504 are refreshed sequentially in the frame n, the frame n+1, the frame n+2, the frame n+3, respectively. In this case, in the frame n, the refresh is not finished in the areas 502-504. That is, the areas 502-504 are refresh-unfinished area. In the frame n+1, the refresh of the area 501 has been finished, while the refresh of the areas 503-504 is unfinished. In a similar manner, in the frame n+2, the areas 501-502 are the refresh-finished area, and the area 504 is the refresh-unfinished area. In the frame n+3, the areas 501-503 are the refresh-finished area.

When encoding an image by the interframe coding, for example, an image in the preceding frame is used as reference. When encoding an image in the refresh-unfinished area, an image in any area in the frame may be used as reference. Therefore, in FIG. 2, references 511, 512 are allowed. However, in order to suppress the propagation of an error, an image in the refresh-unfinished area may not be used as reference, when encoding an image in the refresh-finished area. Therefore, in FIG. 2, references 513, 514 are allowed, while a reference 515 is not allowed.

In addition, in order to provide a "cue play function", an image in the refresh-unfinished area cannot be used as reference, when encoding an image in the refresh-finished area. For example, in the example illustrated in FIG. 3, images in the refresh area or in the refresh-finished area are used as reference (references 521-523). Therefore, in this case, the playback of a moving image can be started from the frame n+3. In contrast, in the example illustrated in FIG. 4, an image in the refresh-unfinished area is used as reference (a reference 524), when encoding an image in the refresh-finished area. In this case, since the frame n+1 cannot be decoded, the frame n+2 and the frame n+3 also cannot be played back, as a result. Therefore, the playback of the moving image cannot be started from the frame n+3.

FIG. 5 describes a problem of the sequential refresh. Here, it is assumed that an image in a block A in the frame n+1 is encoded referring to an image of the frame n. It is also assumed that a block B and a block C are detected as candidates of reference images for the block A. The block B does not include any image of the refresh-unfinished area. On the other hand, the block C includes an image of the refresh-unfinished area.

Under such conditions, the propagation of an error is suppressed by prohibiting the reference to the block C. However, when the block C is preferable to the block B as reference image for the motion compensation of the block A, if coding/decoding is performed using the image in the block B, it causes the degradation of the image.

Thus, with the conventional motion-compensated interframe prediction coding, there has been a risk of causing the degradation of the image when adopting the sequential refresh. In other words, with the conventional motion-compensated interframe prediction coding, it has been difficult to realize the suppression of the peak of the information amount with good image quality.

SUMMARY

According to an aspect of an invention, a video encoder that encodes each of a plurality of blocks obtained by dividing an input image, includes: a definition unit configured to define a valid area which is allowed to be used as reference in a reference image in interframe coding; a detection unit configured to detect a reference area in the reference image for a target block; a predicted image generation unit configured to generate a predicted image by outputting an image of the reference area for the reference area belonging to the valid area and outputting a complementary image for the reference area not belonging to the valid area; and a coding unit configured to encode the input image using the predicted image. Valid area information indicating the valid area is transmitted to a video decoder, for each group of a plurality of blocks.

According to another aspect of an invention, a video decoder that decodes encoded data obtained by a video encoder that encodes each of a plurality of blocks obtained by dividing an input image, includes: an obtaining unit configured to obtain, from information in the encoding, valid area information defining valid area which is allowed to be used as reference in a reference image in interframe coding; a detection unit configured to detect a reference area in the reference image for a target block; a predicted image generation unit configured to generate a predicted image by outputting an image of the reference area for the reference area belonging to the valid area and outputting a complementary image for the reference area not belonging to the valid area; and a decoding unit configured to decode the encoded data using the predicted image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram describing the sequential refresh.

FIG. 7 is a diagram illustrating the configuration of a predicted image generation unit provided in the video encoder.

FIG. 8 is a diagram describing the detection of the reference area.

DESCRIPTION OF EMBODIMENTS

Figure 2:
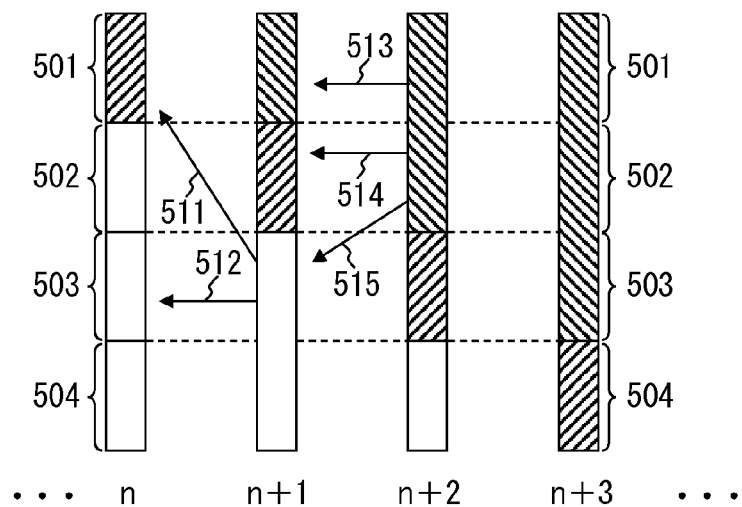
FIG. 2 is a diagram describing the restriction of the reference area.
Figure 3:
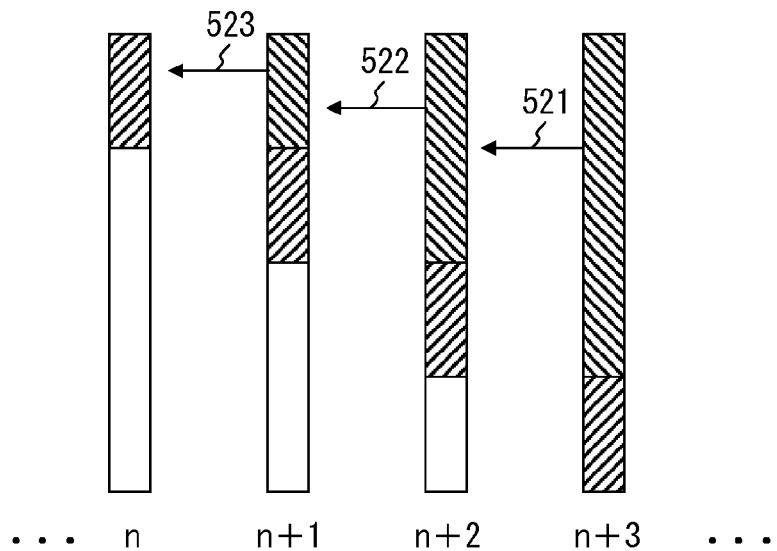
FIG. 3 is a diagram describing the cue play of a moving image.
Figure 4:
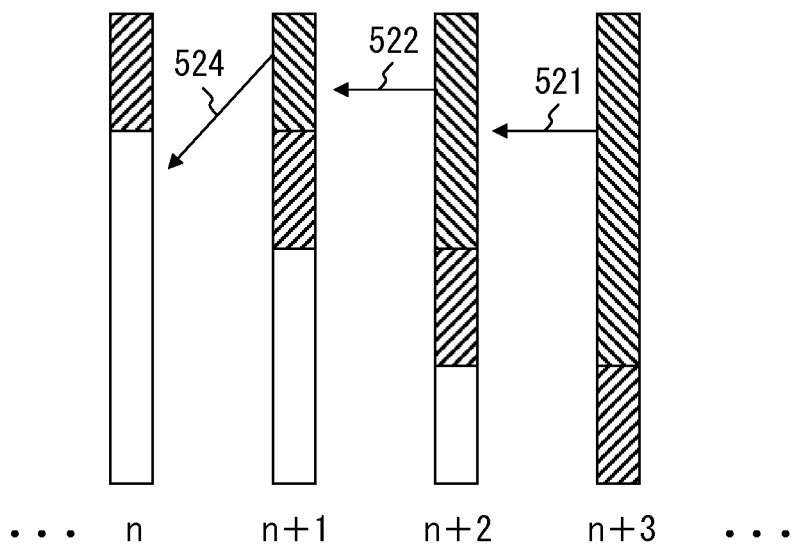
FIG. 4 is a diagram describing a problem about the cue play of a moving image.
Figure 5:
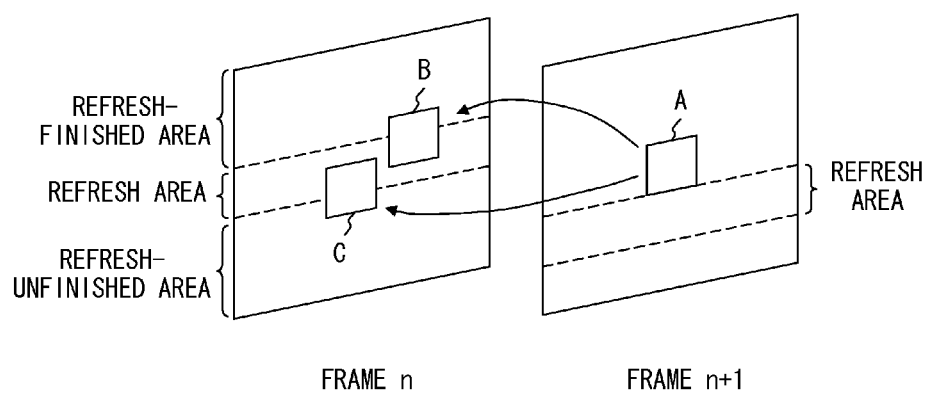
FIG. 5 is a diagram describing a problem of the sequential refresh.
Figure 6:
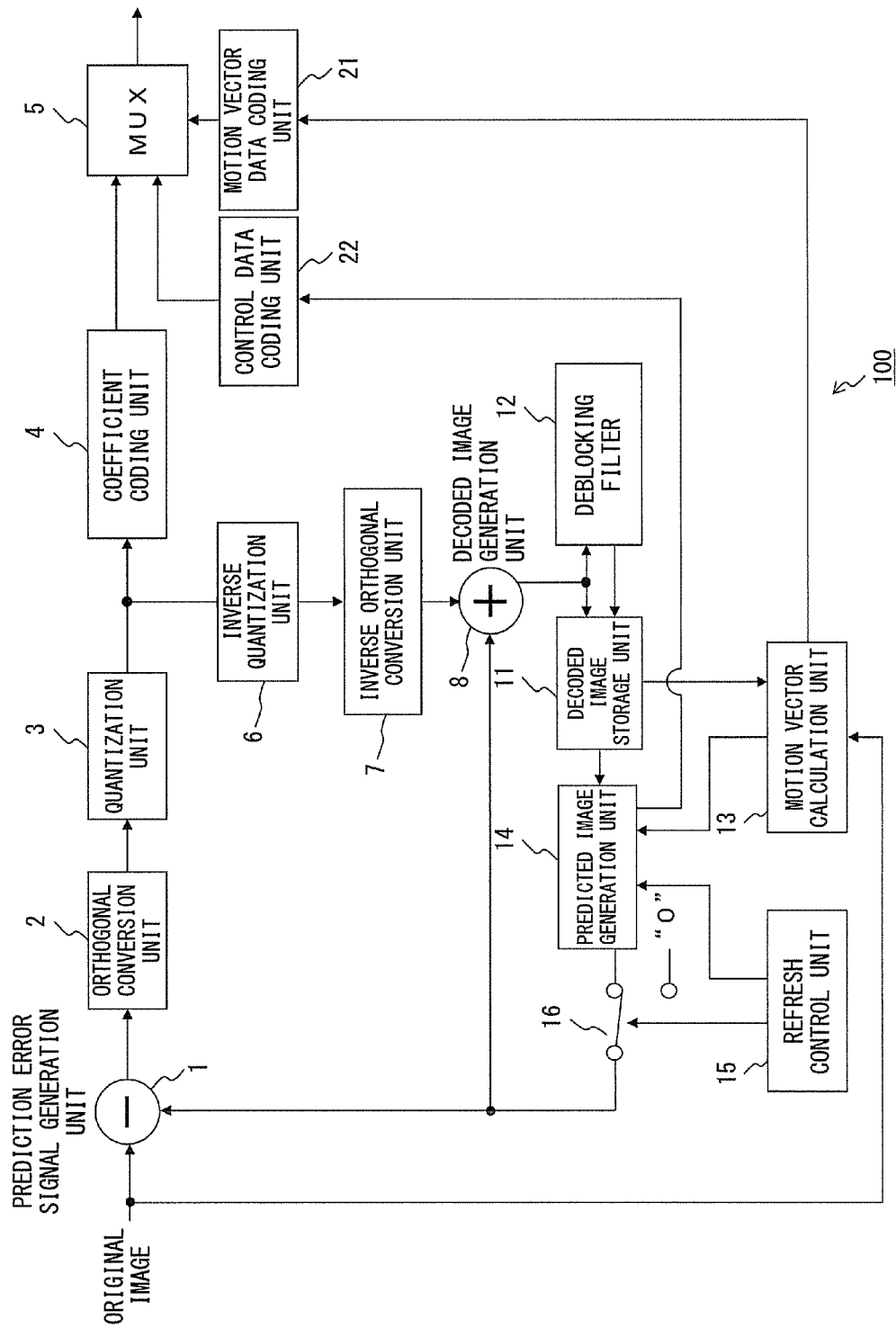
FIG. 6 is a diagram illustrating the configuration of a video encoder according to an embodiment.

FIG. 6 illustrates the configuration of a video encoder according to an embodiment. A video encoder 100 encodes video data using motion-compensated prediction, for each of a plurality of blocks obtained by dividing an image. The sequential refresh descried with reference to FIG. 1 is adopted for the interframe coding. Either forward prediction or bidirectional prediction may be performed for the interframe coding.

A prediction error signal generation unit 1 calculates the difference (that is, error) between an original image and a predicted image for each frame (or, for each block), and outputs a prediction error signal representing the calculated error. The predicted image is to be described later. An orthogonal conversion unit 2 performs orthogonal conversion of the prediction error signal. The orthogonal conversion in this example is, for example, DCT (Discrete Cosine Transform). In the DCT conversion, each pixel value is converted into a frequency component, and coefficient data representing each frequency component is generated. A quantization unit 3 quantizes an output signal (in this example, the coefficient data) of the orthogonal conversion unit 3. A coefficient coding unit 4 performs entropy coding of the quantized coefficient data. A multiplexer 5 multiplexes and transmits the coded coefficient data, coded motion vector data and coded control data. The control data is to be described later.

The data output from the multiplexer 5 is transmitted to a video decoder, for example, via a network. Alternatively, the data output from the multiplexer 5 is written into a storage apparatus. The multiplex method is TDM, for example and without being a limitation.

An inverse quantization unit 6 and an inverse orthogonal conversion unit 7 perform conversion processes corresponding to those of the quantization unit 3 and the orthogonal conversion unit 2, respectively, to regenerate the prediction error signal. A decoded image generation unit 8 generates a decoded image based on the regenerated prediction error signal and the predicted image. The decoded image is an image that is supposed to be obtained in the video decoder.

A decoded image storage unit 11 is, for example, a semiconductor memory, and temporarily stores the decoded image generated by the decoded image generation unit 8. At this time, the decoded image may be stored in the decoded image storage unit 11 after the block distortion is removed by a deblocking filter 12.

A motion vector calculation unit 13 calculates the motion vector of a target block, based on the original image and the decoded image stored in the decoded image storage unit 11. The calculation of the motion vector may be realized by a known technique, while there is no particular limitation. Meanwhile, calculating the motion vector of a target block is virtually equivalent to detecting a reference area for the target block.

A predicted image generation unit 14 generates a predicted image based on the decoded image stored in the decoded image storage unit 11 and the motion vector obtained by the motion vector calculation unit 13. The configuration and operation of the predicted image generation unit 14 are described in detail later.

A refresh control unit 15 generates a refresh control signal to perform the sequential refresh described with reference to FIG. 1. A selection unit 16 selects the predicted image generated by the predicted image generation unit 14 or "zero", in accordance with the refresh control signal. At this time, in an area in which the refresh is not performed, the predicted image generated by the predicted image generation unit 14 is selected. In this case, the prediction error signal generation unit 1 outputs a prediction error signal representing the difference between the original image and the predicted image. In other words, the interframe coding is performed. On the other hand, in an area in which the refresh is performed, "zero" is selected. In this case, the prediction error signal generation unit 1 outputs the original image as the prediction error signal. In other words, the intraframe coding is performed.

A motion vector data coding unit 21 encodes motion vector data generated by the motion vector calculation unit 13 and representing motion vector. The method for encoding the motion vector data is, for example, entropy coding. A control data coding unit 22 encodes control data generated by the predicted image generation unit 14. The method for encoding the control data is, for example, entropy coding. The control data is described in detail later.

FIG. 7 illustrates the configuration of the predicted image generation unit 14. As described with reference to FIG. 6, the predicted image generation unit 14 is provided with the motion vector data and the refresh control signal.

A reference area detection unit 31 is provided with the motion vector data. The motion vector data, which is generated by the motion vector calculation unit 13, represents the motion vector of a target block, as illustrated in FIG. 8. The reference area detection unit 31 detects the position (namely, the coordinates) of the reference area in a reference image that should be referred to by the coding target block. For example, assuming that the coordinates of the four corners of the target block are "(89, 121) (96, 121) (89, 128) (96, 128)" and that the motion vector of target block is "(7, 9)", the position "(82, 112) (89, 112) (82, 119) (89, 119)" is obtained as the position of the reference area. Meanwhile, the reference image extracted, for example, from immediately preceding frame of the original image, while there is no particular limitation. The reference area detection unit 31 provides reference area information representing the detected reference area to an extraction unit 32 and a decision unit 34.

The extraction unit 32 extracts the reference image from the decoded image storage unit 11, and further extracts pixel data of the reference area in the reference image based on the reference area information. When the size of the target block is 8×8, 64 sets of pixel data are extracted.

A refresh management unit 33 is provided with the refresh control signal. The refresh control signal is generated by the refresh control unit 15 to realize the sequential refresh, and specifies the area in which the intraframe coding is performed in each frame. The refresh management unit 33 generates valid area information representing a valid area which is allowed to be used as reference in another frame, in accordance with the refresh control signal.

Figure 9A:
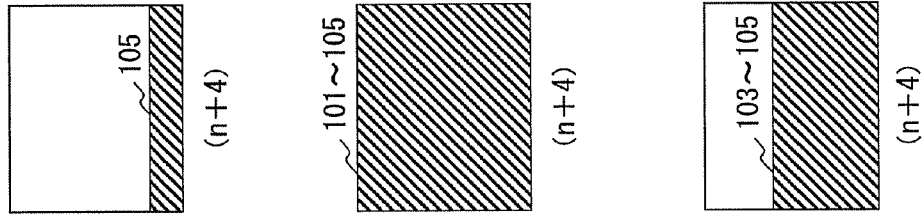
FIG. 9A-9C are diagrams describing valid area information.
Figure 9A:
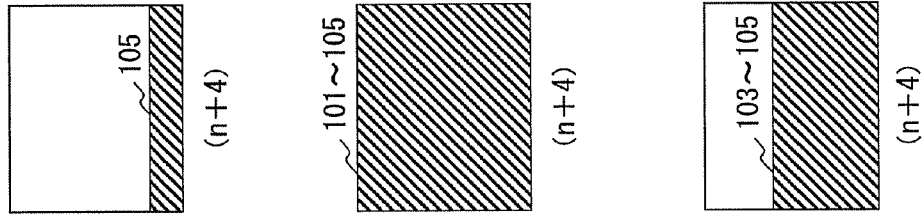
Figure 9A:
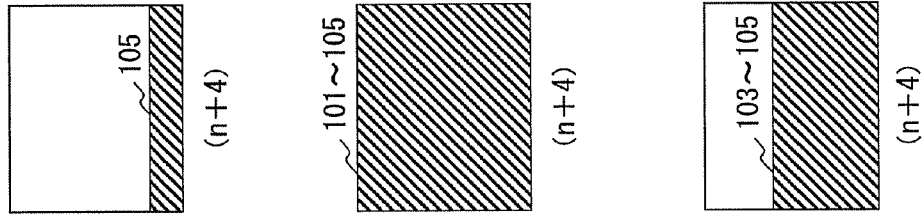
Figure 9A:
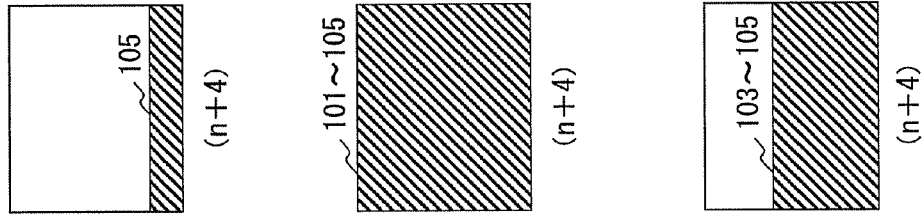
Figure 9B:
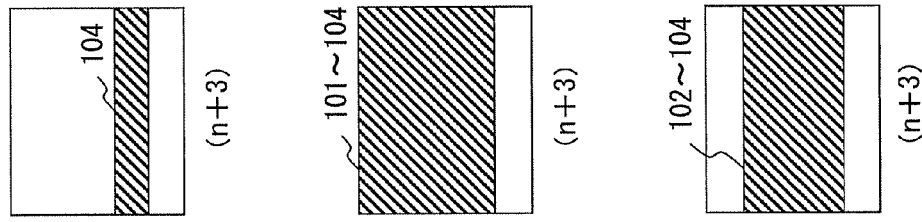
Figure 9B:
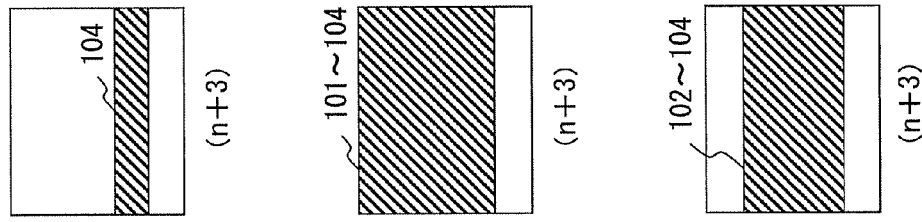
Figure 9B:
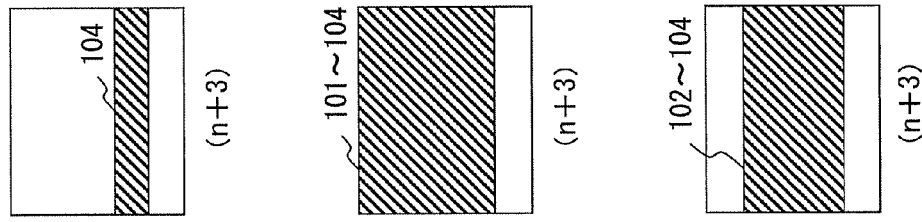
Figure 9C:
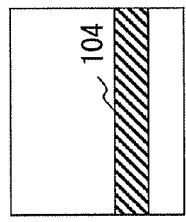
Figure 9C:
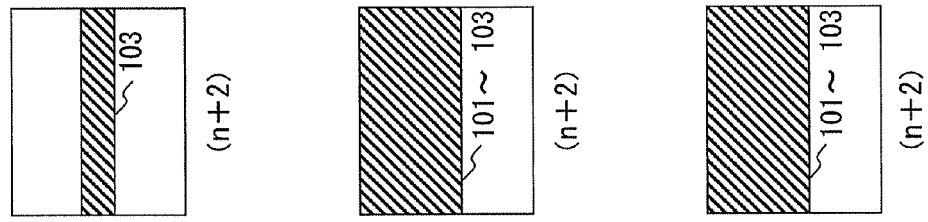
Figure 9C:
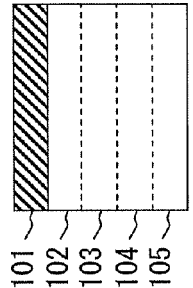
Figure 9C:
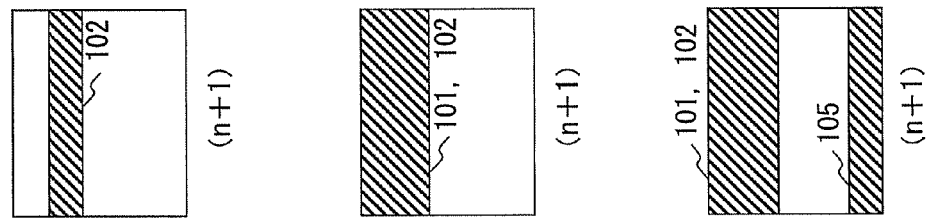

FIG. 9A-9C illustrate the valid area information. In order to simplify the explanation, it is assumed that, as illustrated in FIG. 9A, the image area of each frame has five areas 101-105, and that the respective areas 101-105 are sequentially refreshed. That is, the area 101, 102, 103, 104, 105 are refreshed in the frame n, frame n+1, frame n+2, frame n+3, frame n+4, respectively.

In the embodiment, the valid area is defined as "the refresh area and the area in the upper side of the refresh area" as illustrated in FIG. 9B. Therefore, in the frame n, the area 101 is the valid area. In the frame n+1, the areas 101, 102 are the valid area. In the frame n+2, the areas 101-103 are the valid area. In the frame n+3, the areas 101-104 are the valid area. In the frame n+4, the areas 101-105 are the valid area.

Alternatively, as illustrated in FIG. 9C, the valid area may be defined as "the refresh area and the area in which the refresh has been performed within a specified period". In FIG. 9C, the "specified period" corresponds to a time period of two frames. Therefore, focusing on the frame n+2 for example, the area 102 is refreshed in the frame n+1, and the area 101 is refreshed in the frame n. Therefore, the valid area in the frame n+2 is the areas 101-103. The valid area is defined similarly for the other frames. The area other than the valid area in a frame may be referred to as the "non-valid area" in the description hereinafter.

The decision unit 34 checks whether or not the reference area detected by the reference area detection unit 31 belongs only to the valid area. In other words, the decision unit 34 checks whether the reference area contains the pixels of the valid area only, or contains a pixel of the non-valid area as well. Meanwhile, the valid area information indicating the valid area (and the non-valid area) is generated for each frame by the refresh management unit 33, as described above.

A complement unit 35 generates a complementary image in accordance with an algorithm described later. The complementary image may be generated using the decoded image (that is, the reference image) stored in the decoded image storage unit 11, or may be generated independently from the decoded image. A selection unit 36 selects the pixel of the reference area extracted by the extraction unit 32 or the pixel of the complementary image generated by the complement unit 35, in accordance with the result of the decision by the decision unit 34. In one example, for the reference area belonging to the valid area, the image in the reference area is output, and for the reference area belonging to the non-valid area, the complementary image is output.

The operation of the predicted image generation unit 14 is described with reference to FIG. 10 and FIG. 11. It is assumed here that the coding target block is 8×8 pixels. In this case, the reference area is also 8×8 pixels.

Figure 10:
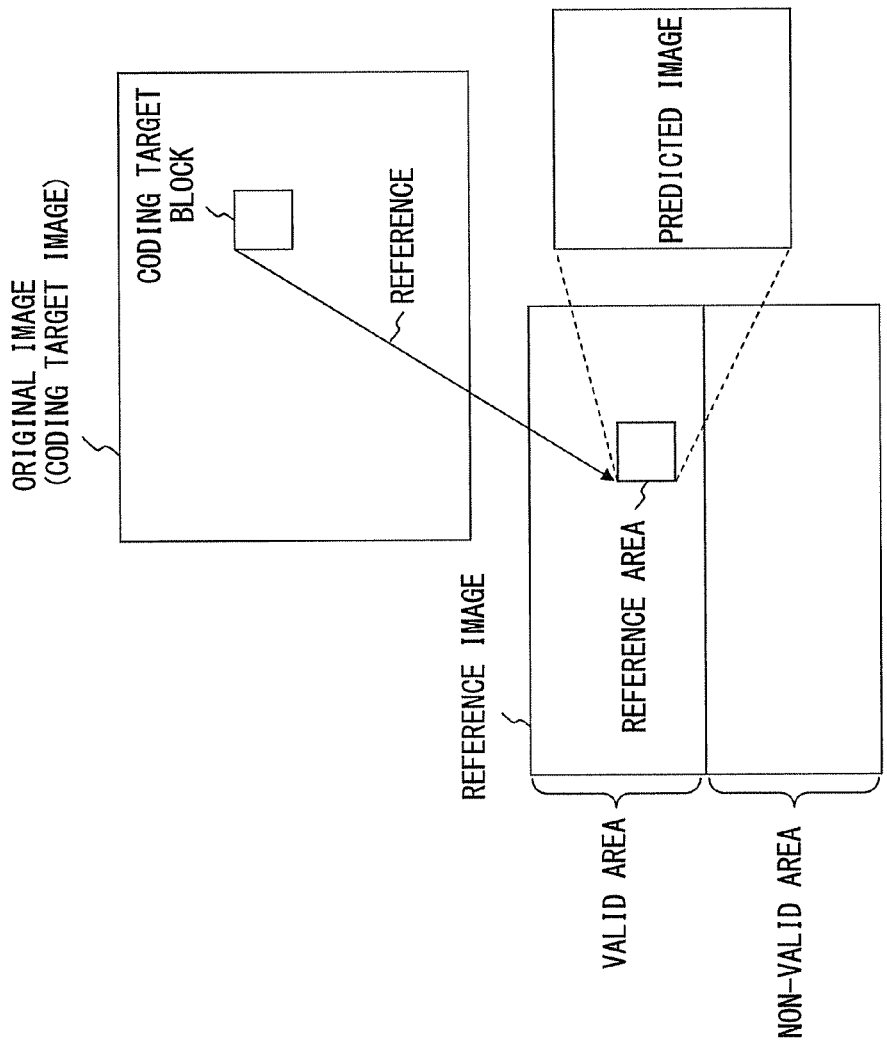
FIG. 10 and FIG. 11 are diagrams describing the operation of the predicted image generation unit.

FIG. 10 illustrates the operation in a case where the reference area contains only the pixels of the valid area. In this case, as the predicted image of the intraframe coding, the predicted image generation 14 outputs the image in the reference area in the decoded image without change. Therefore, as the pixel data of the predicted image, the selection unit 35 selects the pixel data of the reference area in the decoded image.

Figure 11:
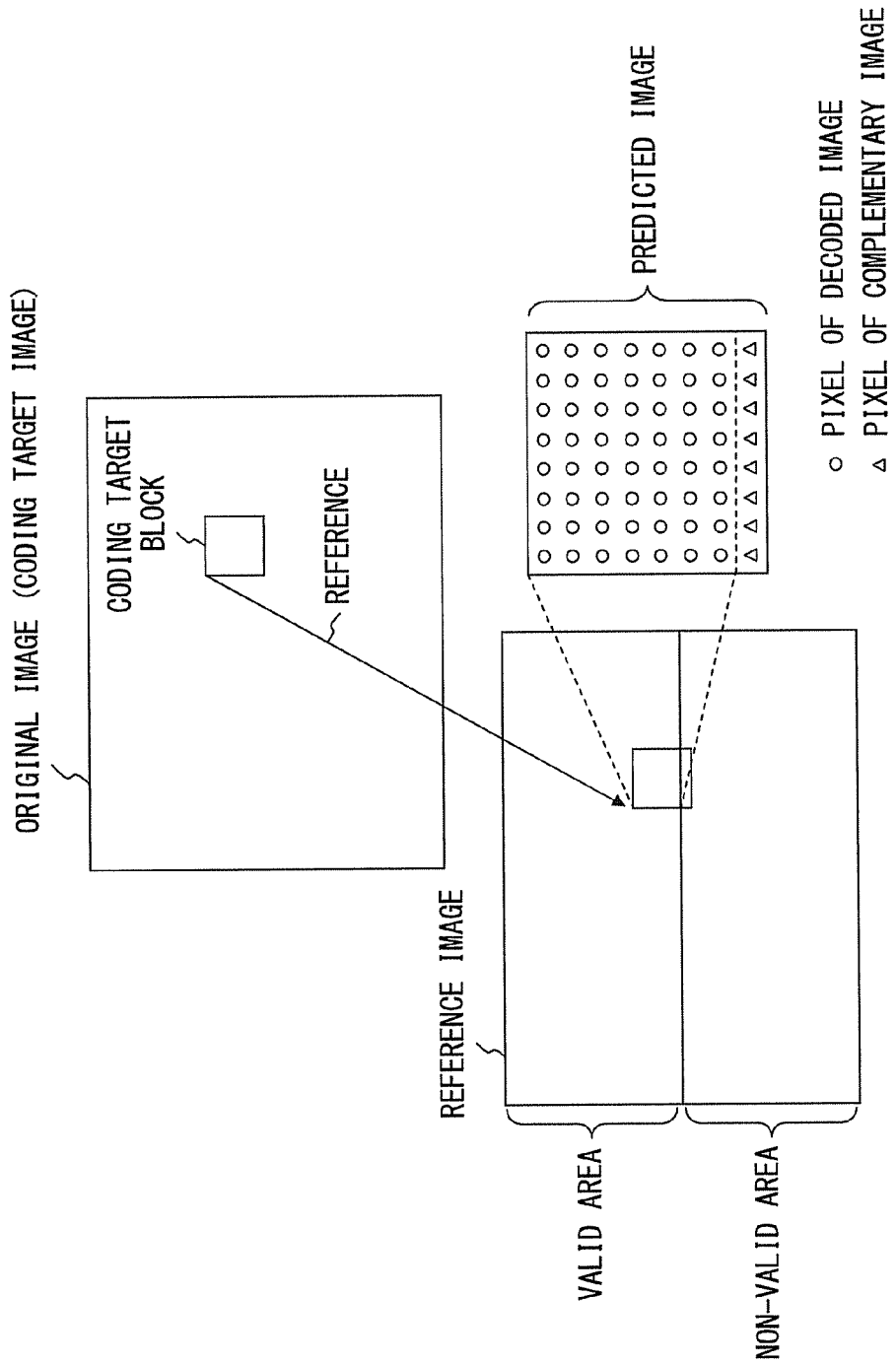

FIG. 11 illustrates the operation in a case where the reference area contains a pixel of the non-valid area. It is assumed in this case that the first-seventh lines of the reference area belong to the valid area, and the eighth line belongs to the non-valid area. In this case, the predicted image generation unit 14 outputs, as the predicted image, the image in the reference area for the reference area belonging to the valid area, and outputs the complementary image for the reference image belonging to the non-valid area. Therefore, the pixel data of the reference area in the decoded image is selected as pixel data of the first-seventh lines of the 8×8 block, and the pixel data of the complementary image is selected as the pixel data of the eighth line.

The predicted image generated as described above is sent to the prediction error signal generation unit 1. Then, the difference (that is, the error) between the original image and the predicted image is calculated, and the error is encoded. Meanwhile, in the refresh area, since the intraframe coding is performed, "zero" instead of the predicted image is selected by the selection unit 16.

The valid area information generated by the refresh management unit 33 is encoded by the control data coding unit 22. That is, the valid area information is transmitted as control data.

Figure 12A:
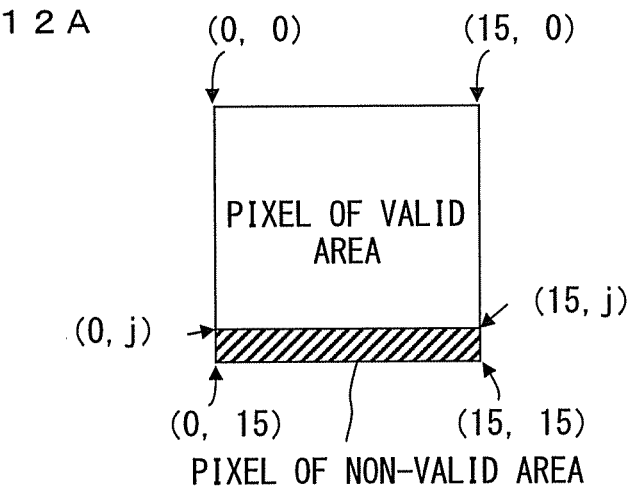
FIG. 12A-12C are diagrams describing the first complement method.

Next, examples of the method of generating the complementary image are described. In the description hereinafter, the coding target block (or the unit of motion prediction) is assumed to be 16×16 pixels, as illustrated in FIG. 12A, where (0, 0)-(15, j) belong to the valid area. Here, $0 \leq j \leq 15$.

Figure 12B:
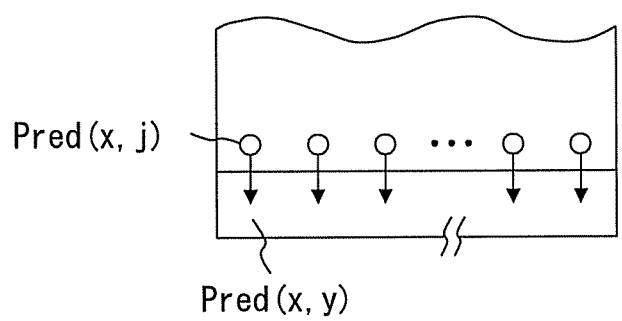

In the first complement method, the pixel data of the non-valid area (that is, the pixel data of the complementary image) is generated by copying the pixel data of the nearest pixels in the valid area, as illustrated in FIG. 12B. The process is expressed by the following equation (1)

$$pred(x,y)=pred(x,j) \quad (1)$$

where "pred(x, y)" is the pixel data of a pixel of the non-valid area, and "pred(x, j)" is the pixel data of each pixel on the line adjacent to the non-valid area.

Figure 12C:
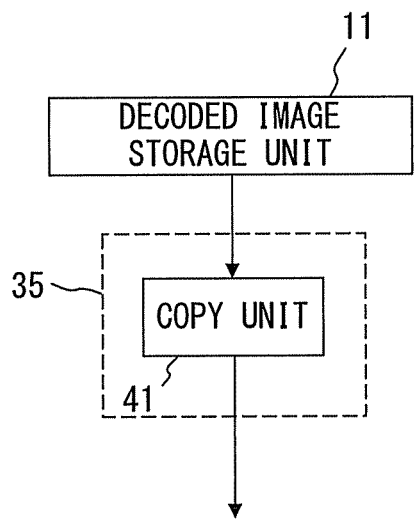

The first complement method is realized by the configuration illustrated in FIG. 12C. To perform the first complement method, the complement unit 35 has a copy unit 41. The copy unit 41 performs the operation of the equation (1) for the pixels belonging to the non-valid area, in the pixels forming the reference area.

In the second complement method, the pixel data of each pixel of the non-valid area is generated by averaging the pixel data of the pixels in the valid area adjacent to the non-valid area. The process is expressed by the following equation (2).

$$pred(x, y) = \sum_{i=0}^{15} pred(i, j)/16 \quad (2)$$

Figure 13A:
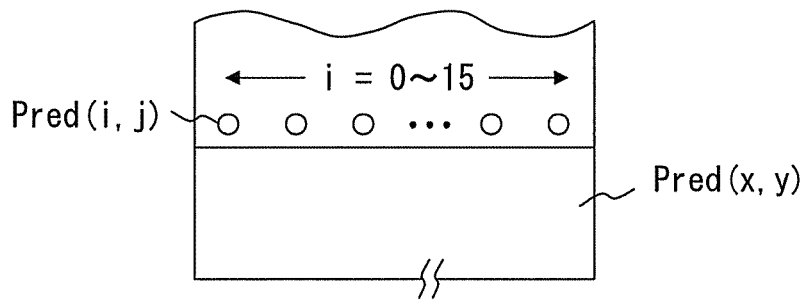
FIGS. 13A and 13B are diagrams describing the second complement method.
Figure 13B:
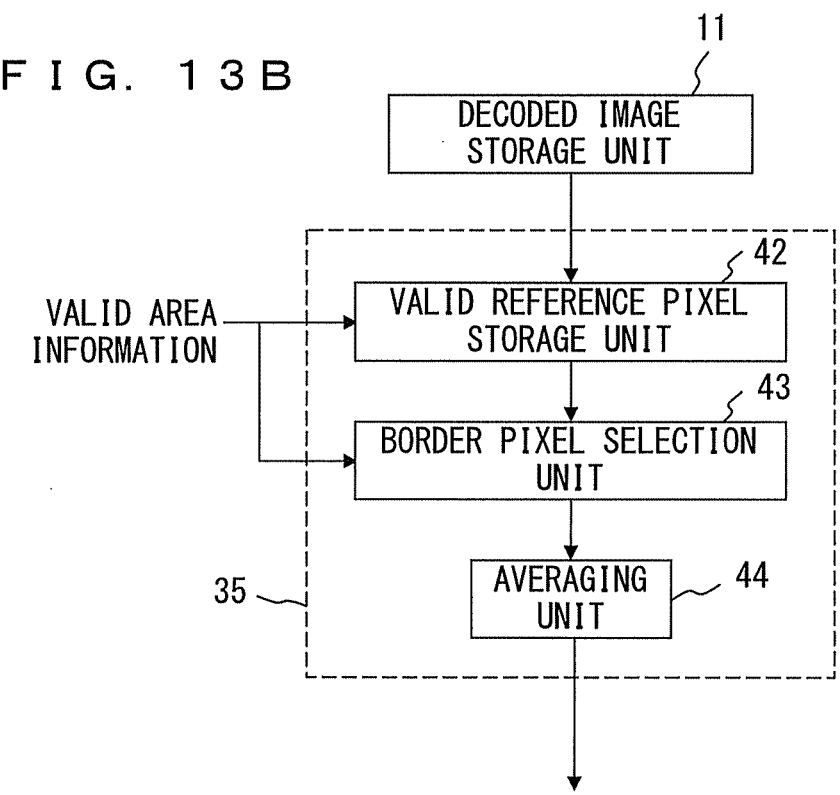

The second complement method is realized by the configuration illustrated in FIG. 13B. To perform the second complement method, the complement unit 35 has a valid reference pixel storage unit 42, a border pixel selection unit 43 and an averaging unit 44. The valid reference pixel storage unit 42 stores the pixel data of pixels belonging to the valid area, in the pixels forming the reference image. The border pixel selection unit 43 selects the pixel data of pixels on a line adjacent to the non-valid area, in the pixels stored in the valid reference pixel storage unit 42. The averaging unit 44 averages the pixel data selected by the border pixel selection unit 43. That is, the operation of the equation (2) mentioned above is executed.

Figure 14A:
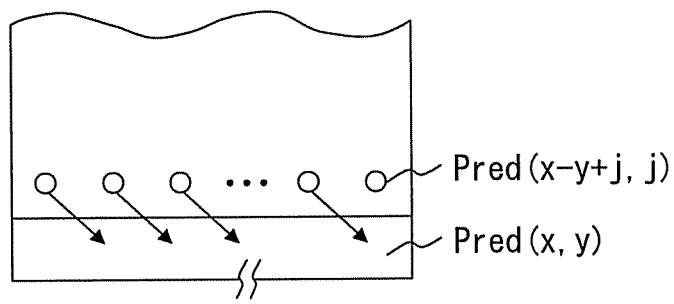
FIGS. 14A and 14B are diagrams describing the third complement method.

In the third complement method, the pixel data of the non-valid area is generated by filtering the pixel data of pixels in the valid area that are adjacent to the non-valid area, as illustrated in FIG. 14A. The process is expressed by the following equation (3).

$$pred(x, y) = \sum_{i=0}^{15} w_{x,y}(i)pred(i, j) \quad (3)$$

In the equation (3), the filter coefficient is assumed to be "1". Therefore, for example, when the complement is to be performed obliquely in the 45-degree direction, the filtering is performed with the following conditions.

$$W_{x,y}(x-y+j-1)=0.25$$

$$W_{x,y}(x-y+j)=0.5$$

$$W_{x,y}(x-y+j+1)=0.25$$

while "$W_{x,y}(i)=0$" when "i" does not correspond to any of "x−y+j−1", "x−y+j", "x−y+j+1".

Figure 14B:
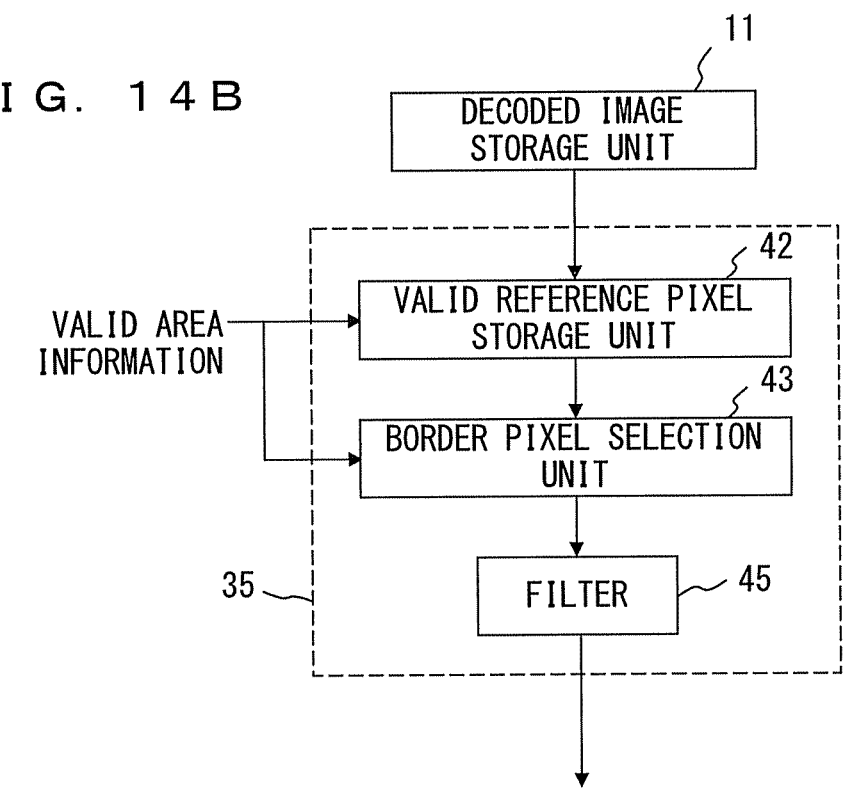

The third complement method is realized by the configuration illustrated in FIG. 14B. To perform the third complement method, the complement unit 35 has the valid reference pixel storage unit 42, the border pixel selection unit 43, and a filter 45. The valid reference pixel storage unit 42 and the border pixel selection unit 43 are similar to those for the second complement method. The filter 45 performs the filter operation according to the equation (3) mentioned above for the pixel data selected by the border pixel selection unit 43.

In the fourth complement method, regardless of the pixels in the valid area, data representing specified color and brightness is generated as the pixel data of the complementary image.

The predicted image generation unit 14 generates the complementary image using any method from the first to fourth complement methods described above, for example. The predicted image generation unit 14 may select the optimal method dynamically (in units of, for example, a block) from two or more complement methods from the first to fourth complement methods and generate the complementary image using the selected method.

Figure 15:
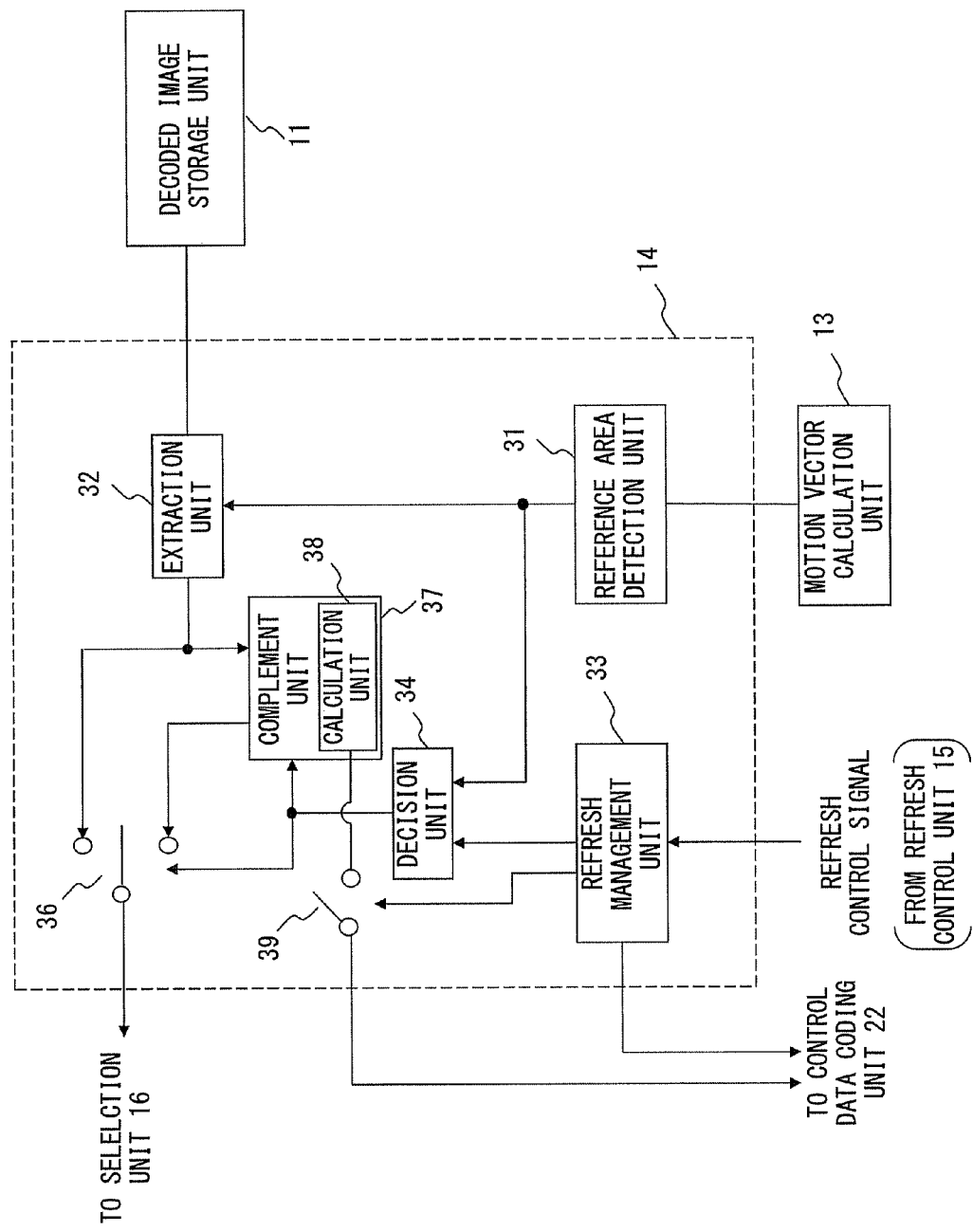
FIG. 15 is a diagram illustrating the configuration of a predicted image generation unit having a function to select the complement method.

FIG. 15 illustrates the configuration of a predicted image generation unit having a function to select the complement method. In FIG. 15, the reference area detection unit 31, the extraction unit 32, the refresh management unit 33, and the decision unit 34 are as described above with reference to FIG. 7.

A complement unit 37 is capable of performing a plurality of complement methods (for example, the first-fourth complement methods described above). A calculation unit 38 selects the optimal method from the plurality of complement methods. The complement unit 37 outputs a complementary image generated using the selected complement method. The calculation unit 38 outputs complement method information indicating the selected method. The complement method information is encoded by the control data coding unit 22, and sent to the video decoder.

Figure 16:
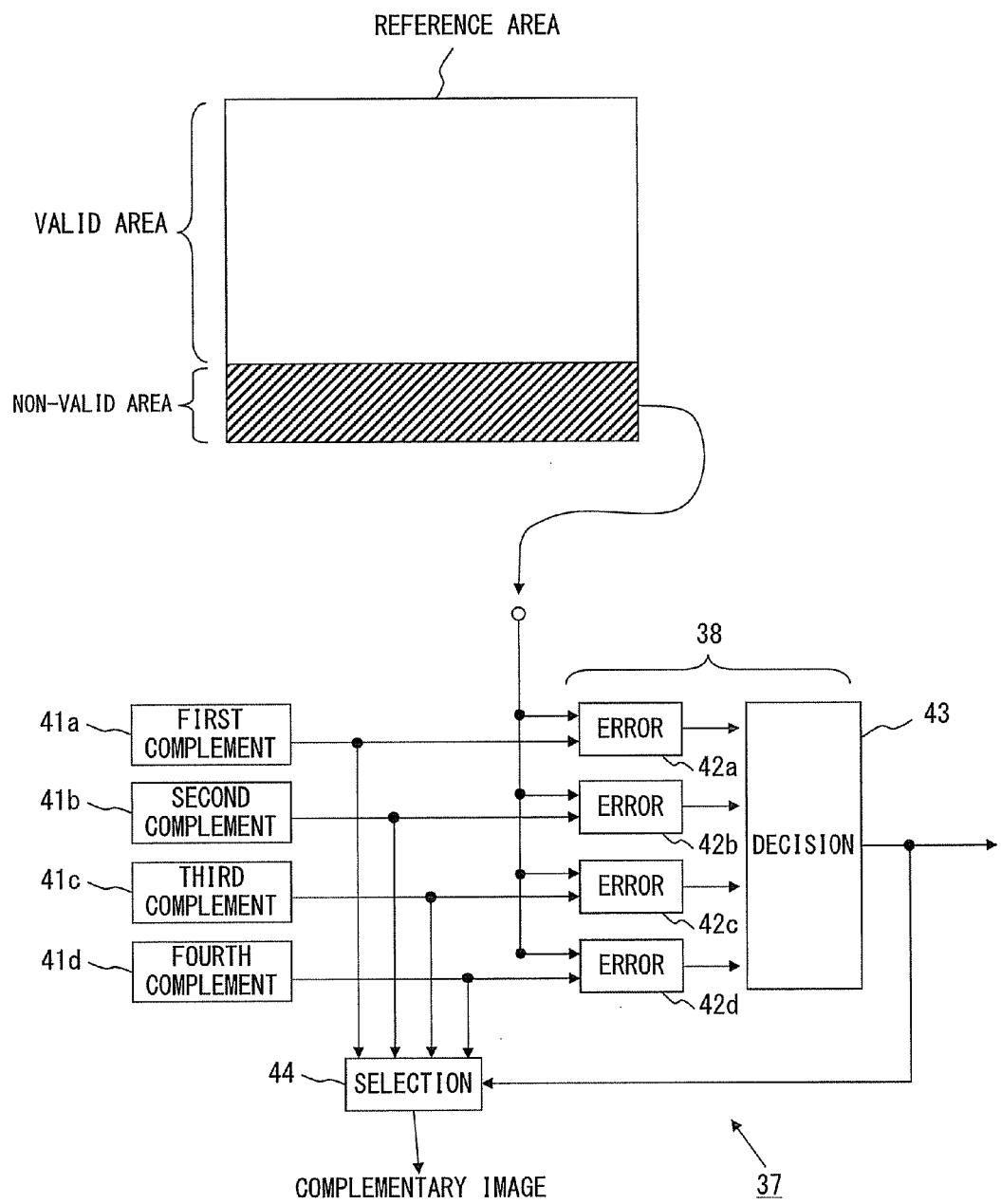
FIG. 16 is a diagram illustrating the configuration of a complement unit having a function to select the complement method.

FIG. 16 illustrates the configuration of the complement unit 37 having a function to select the complement method. In this example, it is assumed that the complement unit 37 has first-fourth complement processing unit 41a-41d that respectively generate complementary pixel data using the first-fourth complement methods. Error calculation units 42a-42d respectively calculate the pixel data of a pixel belonging to the non-valid area in the reference area and the complementary pixel data generated by the complement processing units 41a-41d. Here, the "pixel belonging to the non-valid area in the reference area" is a pixel that is replaced by a complementary pixel by the complement unit 37. The decision unit 43 selects a complement processing unit that generates the pixel data with which the error becomes minimum, from the complement processing units 41a-41d. In accordance with the result of the decision by the decision unit 43, the selection unit 44 selects the pixel data generated by the corresponding complement processing unit.

The method for selecting the complement method is not limited to the method described above. For example, the complement method may be determined according to the motion vector of the coding target block or the motion vector of one or more neighboring block. In this case, for example, the complementary image may be generated in accordance with the first complement method when the motion vector of the target block is small, and the complementary image may be generated in accordance with the second complement method when the motion vector of the target block is large.

Meanwhile, as described above, the complementary image is generated when the reference area contains a pixel of the non-valid area. In other words, when the reference area does not contain any pixels of the non-valid area, the complementary image does not need to be generated, and there in no need to transmit complement method information to the video decoder. Therefore, the predicted image generation unit may be equipped with a switch 39 to direct the complement method information to the control data coding unit 22 only when the reference area contains a pixel of the non-valid area. By adopting this configuration, the information amount of control data transmitted to the video decoder may be reduced. Whether or not the reference area contains any pixel of the non-valid area is determined from the valid area information generated by the refresh management unit 33.

Figure 17:
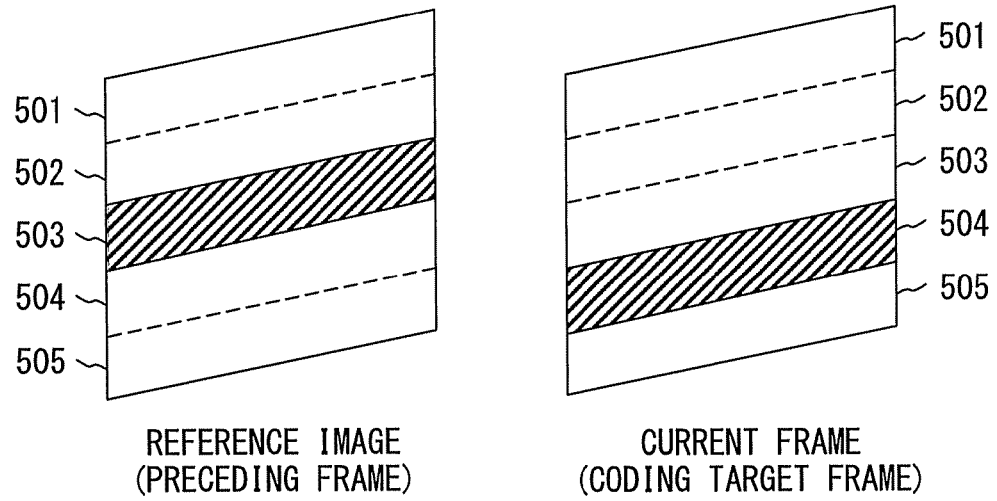
FIG. 17 is a diagram illustrating the notification method of the valid/non-valid area.

FIG. 17 illustrates the notification method of the valid/non-valid area. It is assumed that each frame has areas 501-505. It is also assumed that the current frame (coding target frame) refers to a reference image (immediately preceding frame). It is further assumed that the area 503 has been refreshed in the reference image (immediately preceding frame), and the area 504 is refreshed in the current frame.

In the example illustrated in FIG. 17, the valid area for each block belonging to the areas 501-503 in the current frame is the areas 501-503 in the reference image only. On the other hand, the valid area for each block belonging the area 505 in the current frame is the entire area (that is, the areas 501-505) of the reference image. Thus, the valid area is different for each block.

The valid area information indicating the valid area is transmitted to the video decoder via the control data coding unit 22, as described above. At this time, the valid area information may be generated for each block and transmitted to the video decoder. In addition, the plurality of blocks in the current frame may be divided into a first group of blocks belonging to the area (such as the areas 501-503) for which the reference area is limited and a second group of blocks belonging to the area (such as the area 505) for which the reference area is not limited. Then the valid area information may be transmitted to the video decoder for each group. In this case, for example, the valid area information indicating "the valid area is the area 501-503" is transmitted for the first group, and the valid area information indicating "the valid area is the area 501-505" is transmitted for the second group. Then the video decoder decodes the encoded data according to the valid area information received from the video encoder. Meanwhile, according to H.264, the process may be performed in units of a slice that consists of a plurality of blocks. In this case, the valid area information may be attached to a slice header and transmitted to the video decoder.

The video data encoded by the video encoder configured as described above is transmitted to a video decoder and decoded. Alternatively, the encoded video data is recorded in a recording medium, and then read out by the video decoder and decoded.

Figure 18:
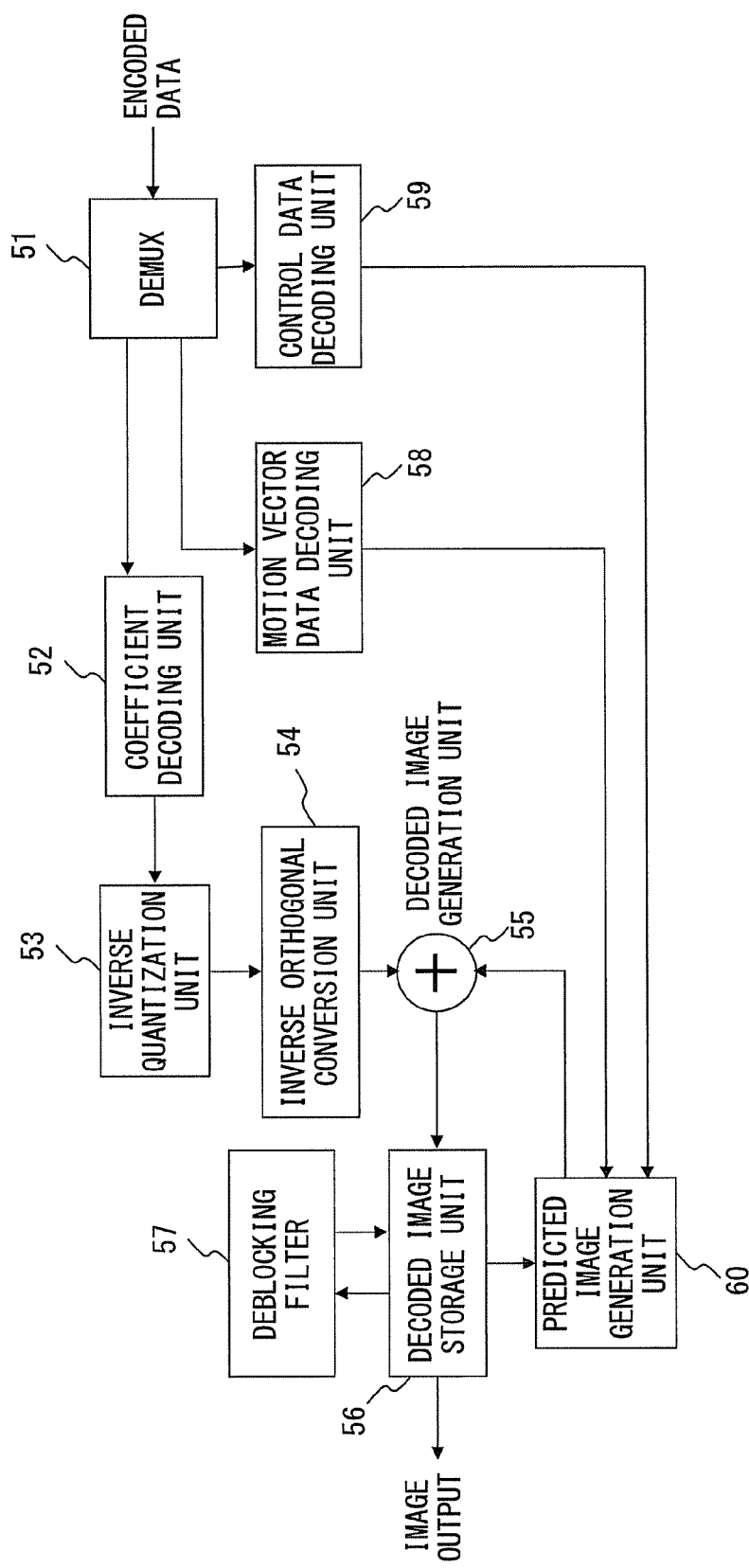
FIG. 18 is a diagram illustrating the configuration of a video decoder according to an embodiment.

FIG. 18 illustrates the configuration of a video decoder according to an embodiment. The video decoder decodes encoded data generated by the video encoder described above, to reproduce a moving image. In the description hereinafter, it is assumed that the predicted image generation unit 14 provided in the video decoder generates the complementary image using a specified complement method.

A demultiplexer 51 demultiplexes received encoded data into coefficient data, motion vector data and control data. A coefficient decoding unit 52 performs entropy decoding of the coefficient data. The entropy decoding by the coefficient decoding unit 52 corresponds to the entropy coding by the coefficient coding unit 4 of the video decoder. An inverse quantization unit 53 performs inverse quantization of the entropy decoded coefficient data. The inverse quantization by the inverse quantization unit 53 corresponds to the quantization by the quantization unit 3. An inverse orthogonal conversion unit 54 performs inverse orthogonal conversion of the inverse quantized coefficient data. The inverse orthogonal conversion by the inverse orthogonal conversion unit 54 corresponds to the orthogonal conversion by the orthogonal conversion unit 2.

A decoded image generation unit 55 reproduces the original image using the coefficient data and a predicted image. The reproduced original image is temporarily stored in a decoded image storage unit 56 as a decoded image. At this time, the decoded image may be stored in the decoded image storage unit 56 after the block distortion is removed by a deblocking filter 57.

A motion vector data decoding unit 58 decodes the received motion vector data. The decoding by the motion vector data decoding unit 58 corresponds to the coding by the motion vector data coding unit 21 of the video encoder. Accordingly, the motion vector of each block is obtained. A control data decoding unit 59 decodes the received control data. The decoding by the control data decoding unit 59 corresponds to the coding by the control data coding unit 22. The control data is, here, the valid area information indicating the valid area which is allowed to be used as reference in the interframe coding. A predicted image generation unit 60 generates a predicted image based on the decoded image stored in the storage unit 56, the motion vector, and the valid area information. The original image is reproduced by the decoded image generation unit 55 using the predicted image.

While the description is omitted in FIG. 18, when the decoding target block belongs to the refresh area, the predicted image generation unit 60 outputs "zero". In this case, the decoded image generation unit 55 stores an image that consists of the pixel data obtained by the inverse orthogonal conversion unit 54 in the decoded image storage unit 56 as the decoded image. That is, for this area, intraframe decoding is performed.

Figure 19:
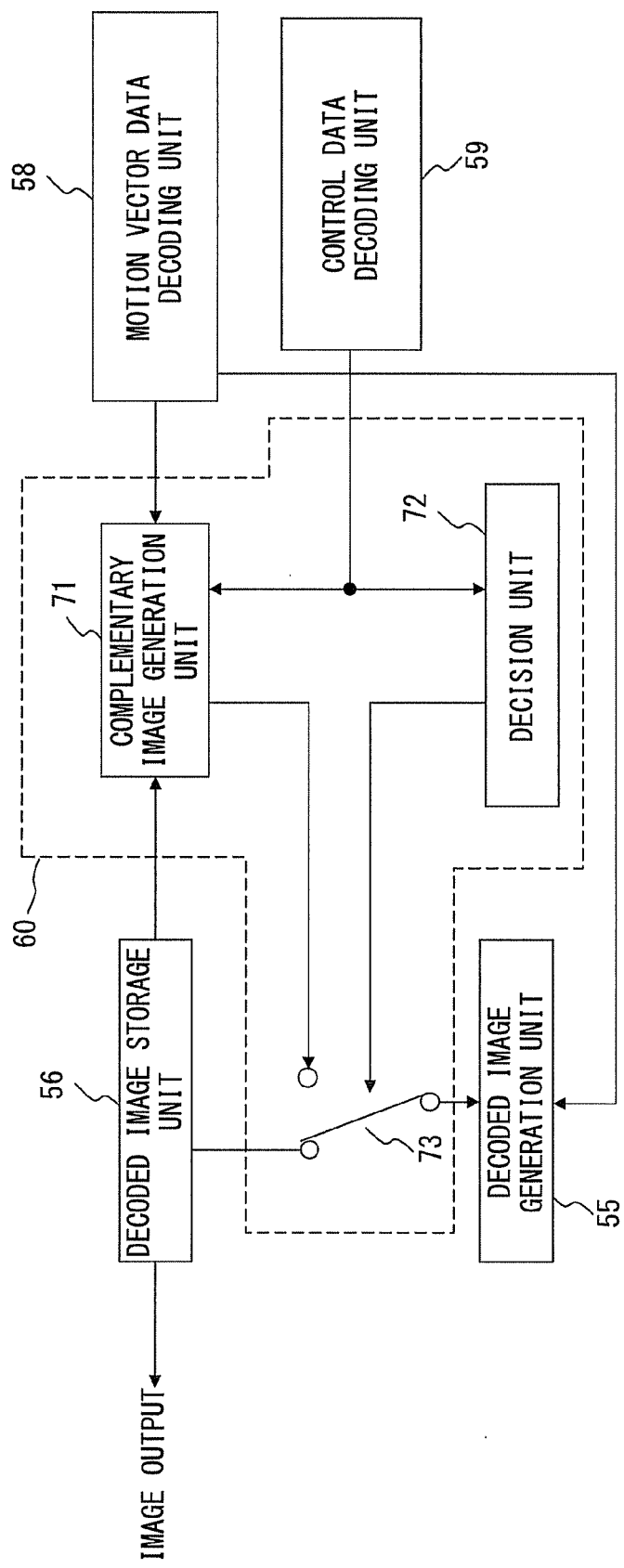
FIG. 19 is a diagram illustrating the configuration and operation of a predicted image generation unit provided in the video decoder.

FIG. 19 illustrates the configuration and operation of the predicted image generation unit 60 of the embodiment. The operation of the predicted image generation unit 60 is basically similar to that of the predicted image generation unit 14 provided in the video encoder. However, the predicted image generation unit 60 is provided in the video decoder, and the valid area information is given from the video encoder.

A complementary image generation unit 71 obtains the motion vector of the decoding target block, and takes out the image of the reference area indicated by the motion vector, from the decoded image storage unit 56. That is, the complementary image generation unit 71 generates pixel data of the complementary image. A decision unit 72 decides whether or not the reference area obtained by the complementary image generation unit 71 contains any pixel of the non-valid area, using the valid area information. A selection unit 73 selects the pixel data read out from the decoded image storage unit 56 when the pixel of the reference area belongs to the valid area. On the other hand, the selection unit 73 selects the pixel data of the complementary image generated by the complementary image generation unit 71 when the pixel of the reference area belongs to the non-valid area. The selection unit 73 recognizes whether a pixel of the reference area belongs to the valid area or non-valid area according to the valid area information.

The complementary image generation unit 71 generates the pixel data of the complementary image with the same method as the complement method in the video encoder. If the complement method is selected for each block from a plurality of complement methods in the video encoder, the complement method information indicating the selected method is provided to the predicted image generation unit 60. Then, in accordance with the provided complement method information, the predicted image generation unit 60 generates the complementary image with the corresponding complement method.

As described above, in the video encoder and the video decoder according to the embodiment, since the sequential refresh is adopted, the peak of the information amount of the encoded data for each frame is suppressed. Meanwhile, since the image in the optimal reference area is used when the interframe coding is performed, the degradation of the quality of the image is suppressed. Furthermore, if the reference area contains a pixel of the non-valid area, the complementary image generated from the pixel data of the valid area is used instead of the image in the invalid area, making it possible to suppress the propagation of an error in the current frame to following frames.

Note that the sequential refresh may be performed for each block, or may be performed for every line or every plurality of lines, or may be performed in other units.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:

1. A video encoder that encodes each of a plurality of blocks obtained by dividing an input image, the video encoder comprising:
   a definition unit configured to define a valid area which is allowed to be used as reference in a reference image in interframe coding;
   a detection unit configured to detect a reference area in the reference image for a target block;
   a predicted image generation unit configured to generate a predicted image; and
   a coding unit configured to encode the input image using the predicted image, wherein
   valid area information indicating the valid area is transmitted to a video decoder, for each group of a plurality of blocks,
   when the reference area is detected within the valid area, the predicted image generation unit generates the predicted image by outputting an image of the reference area,
   when a part of the reference area is detected within the valid area and an other part of the reference area is detected outside the valid area, the predicted image generation unit generates the predicted image by outputting an image of the reference area for the part of the reference area detected within the valid area and by generating a complementary image based on pixels extracted from the valid area and outputting the complementary image for the other part of the reference area detected outside the valid area.

2. The video encoder according to claim 1, further comprising
   a specifying unit configured to specify a refresh area to refresh an image, wherein
   the specifying unit specifies a different area from a refresh area in an immediately preceding frame as the refresh area; and
   the definition unit defines the refresh area and an area in which refresh has been performed within a specified time as the valid area.

3. The video encoder according to claim 1, wherein
   the predicted image generation unit includes a complement unit configured to generate the complementary image based on a pixel in the valid area.

4. A video encoding method for encoding each of a plurality of blocks obtained by dividing an input image, the video encoding method comprising:
   defining a valid area which is allowed to be used as reference in a reference image in interframe coding;
   detecting a reference area in the reference image for a target block;
   generating a predicted image; and
   encoding the input image using the predicted image, wherein
   valid area information indicating the valid area is generated for each group of a plurality of blocks,
   when the reference area is detected within the valid area, the predicted image is generated by outputting an image of the reference area,
   when a part of the reference area is detected within the valid area and an other part of the reference area is detected outside the valid area, the predicted image is generated by outputting an image of the reference area for the part of the reference area detected within the valid area and by generating a complementary image based on pixels extracted from the valid area and outputting the complementary image for the other part of the reference area detected outside the valid area.

5. A video decoder that decodes encoded data obtained by a video encoder that encodes each of a plurality of blocks obtained by dividing an input image, the video decoder comprising:
   an obtaining unit configured to obtain, from information in the encoding, valid area information defining valid area which is allowed to be used as reference in a reference image in interframe coding;
   a detection unit configured to detect a reference area in the reference image for a target block;
   a predicted image generation unit configured to generate a predicted image by; and
   a decoding unit configured to decode the encoded data using the predicted image, wherein
   when the reference area is detected within the valid area, the predicted image generation unit generates the predicted image by outputting an image of the reference area, when a part of the reference area is detected within the valid area and an other part of the reference area is detected outside the valid area, the predicted image generation unit generates the predicted image by outputting an image of the reference area for the part of the reference area detected within the valid area and by generating a complementary image based on pixels extracted from the valid area and outputting the complementary image for the other part of the reference area detected outside the valid area.

6. The video decoder according to claim 5, wherein the predicted image generation unit includes a complement unit configured to generate the complementary image based on a pixel in the valid area.

7. A video decoding method for decoding encoded data obtained by a video encoder that encodes each of a plurality of blocks obtained by dividing an input image, the video decoding method comprising:

obtaining, from information in the encoding, valid area information defining valid area which is allowed to be used as reference in a reference image in interframe coding;

detecting a reference area in the reference image for a target block;

generating a predicted image; and decoding the encoded data using the predicted image, wherein when the reference area is detected within the valid area, the predicted image is generated by outputting an image of the reference area, when a part of the reference area is detected within the valid area and an other part of the reference area is detected outside the valid area, the predicted image is generated by outputting an image of the reference area for the part of the reference area detected within the valid area and by generating a complementary image based on pixels extracted from the valid area and outputting the complementary image for the other part of the reference area detected outside the valid area.

* * * * *